United States Patent
Miller et al.

(10) Patent No.: US 7,156,542 B2
(45) Date of Patent: Jan. 2, 2007

(54) VEHICLE HEADLIGHT SYSTEM HAVING DIGITAL BEAM-FORMING OPTICS

(75) Inventors: Ronald Hugh Miller, Saline, MI (US); Mahendra Somasara Dassanayake, West Bloomfield, MI (US); David Anthony Wagner, Northville, MI (US); Gary Steven Strumolo, Beverly Hills, MI (US); Thomas Edward Pilutti, Ann Arbor, MI (US); Sheran Anthony Alles, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 10/249,225

(22) Filed: Mar. 24, 2003

(65) Prior Publication Data

US 2004/0114379 A1 Jun. 17, 2004

Related U.S. Application Data

(60) Provisional application No. 60/432,973, filed on Dec. 13, 2002.

(51) Int. Cl.
*B60Q 1/08* (2006.01)
*B60Q 1/16* (2006.01)

(52) U.S. Cl. ............... 362/466; 362/511; 362/517

(58) Field of Classification Search ............ 362/466, 362/276, 512–514, 511, 583, 3, 4, 459, 464, 362/465, 509, 257, 277–284, 317, 551, 319–325, 362/517; 349/5, 200, 202, 1, 6, 13, 14, 193, 349/195; 353/13, 29, 97
See application file for complete search history.

(56) References Cited

U.S. PATENT DOCUMENTS

| | | | | | |
|---|---|---|---|---|---|
| 4,060,910 | A | * | 12/1977 | Gell, Jr. ................... | 349/1 |
| 4,161,653 | A | * | 7/1979 | Bedini et al. ............. | 349/195 |
| 4,323,952 | A | * | 4/1982 | Proske ..................... | 362/276 |
| 4,436,376 | A | * | 3/1984 | Fergason .................. | 349/1 |
| 4,491,390 | A | * | 1/1985 | Tong-Shen ............... | 349/14 |
| 4,652,851 | A | * | 3/1987 | Lewin ...................... | 349/1 |
| 4,858,080 | A | * | 8/1989 | Oikawa .................... | 362/466 |
| 4,868,721 | A | * | 9/1989 | Soardo ..................... | 362/466 |
| 4,872,745 | A | * | 10/1989 | Fujisawa et al. ......... | 362/512 |
| 4,891,559 | A | | 1/1990 | Matsumoto et al. | |
| 4,985,816 | A | * | 1/1991 | Seko et al. ............... | 362/513 |
| 5,012,274 | A | * | 4/1991 | Dolgoff .................... | 349/5 |
| 5,023,758 | A | * | 6/1991 | Allen et al. .............. | 362/514 |
| 5,161,875 | A | * | 11/1992 | Sekiguchi et al. ........ | 362/466 |
| 5,311,410 | A | * | 5/1994 | Hsu et al. ................. | 362/552 |
| 5,343,367 | A | * | 8/1994 | Davenport et al. ....... | 362/558 |
| 5,436,806 | A | * | 7/1995 | Kato ........................ | 362/511 |
| 5,562,336 | A | * | 10/1996 | Gotou ...................... | 362/466 |
| 5,567,032 | A | * | 10/1996 | Heizmann ................ | 362/466 |
| 5,660,454 | A | * | 8/1997 | Mori et al. ............... | 362/466 |
| 5,681,103 | A | * | 10/1997 | Remillard et al. ........ | 362/465 |

(Continued)

*Primary Examiner*—Sandra O'Shea
*Assistant Examiner*—Ismael Negron
(74) *Attorney, Agent, or Firm*—Frank A. MacKenzie; Artz & Artz, P.C.

(57) ABSTRACT

A vehicle headlight system including a light source, digital beam forming optics optically coupled to the light source, and a memory storing a plurality of light illumination patterns. The memory is electrically coupled to the digital beam forming optics. The digital beam forming optics is adapted to output light from the light source in the form of at least one of the light illumination patterns in response to at least one vehicle operating condition.

17 Claims, 7 Drawing Sheets

U.S. PATENT DOCUMENTS

| | | |
|---|---|---|
| 5,938,319 A * | 8/1999 | Hege .......................... 362/459 |
| 6,010,237 A * | 1/2000 | Gotou ........................ 362/466 |
| 6,238,074 B1 * | 5/2001 | Hulse et al. ................ 362/551 |
| 6,281,632 B1 | 8/2001 | Stam et al. |
| 6,293,686 B1 * | 9/2001 | Hayami et al. ............. 362/465 |
| 6,481,876 B1 * | 11/2002 | Hayami et al. ............. 362/464 |
| 6,497,503 B1 * | 12/2002 | Dassanayake et al. ...... 362/465 |
| 6,752,508 B1 * | 6/2004 | Kobayashi .................. 362/466 |
| 6,805,472 B1 * | 10/2004 | Fukawa ...................... 362/466 |
| 2001/0026451 A1 | 10/2001 | Hasumi et al. |
| 2001/0030870 A1 * | 10/2001 | Hiramatsu et al. .......... 362/465 |
| 2002/0001195 A1 | 1/2002 | Iwamoto et al. |
| 2002/0015308 A1 | 2/2002 | Naganawa et al. |
| 2002/0036901 A1 | 3/2002 | Horii et al. |
| 2002/0036907 A1 * | 3/2002 | Kobayashi et al. ......... 362/465 |
| 2002/0039294 A1 | 4/2002 | Okuchi et al. |
| 2002/0039296 A1 | 4/2002 | Nishimura et al. |
| 2002/0047087 A1 | 4/2002 | Schofield et al. |
| 2002/0057572 A1 | 5/2002 | Kondo et al. |
| 2002/0060522 A1 | 5/2002 | Stam et al. |
| 2004/0114379 A1 * | 6/2004 | Miller et al. ................. 362/464 |

* cited by examiner

VEHICLE HEADLIGHT SYSTEM HAVING DIGITAL BEAM-FORMING OPTICS

BACKGROUND OF INVENTION

The present invention relates to a vehicle headlight system and, in particular, concerns a vehicle headlight system using digital beam pattern control in response to vehicle and roadway conditions for improved visibility and roadway illumination. This modulated beam can be in addition to the existing fixed beam, so as to provide enhanced illumination.

Ever since the advent of the automobile, automotive manufacturers have been striving to improve roadway illumination by various vehicle headlight configurations in order to improve the drivability and safety aspects of operating the vehicle in dark or otherwise low visibility conditions such as night-time driving conditions. Numerous vehicle headlight configurations and systems have been proposed to automatically control the state of a vehicle's headlights. For example, many vehicles today include daytime running lights wherein the vehicle's headlights are illuminated continuously during daylight to make the vehicle more noticeable to other vehicles. Many vehicles also include headlights that automatically become active when low light level conditions are detected. Other vehicle headlight systems have been proposed which mechanically "steer" the headlights when, for example, the vehicle steering wheel is turned to bias the headlights toward the area where the vehicle is being directed. Other headlight control systems automatically dim the headlights from "high beam" mode to "low beam" mode upon the detection of an oncoming vehicle's headlights or a leading vehicle's taillights. All of these vehicle headlight systems have the common drawback of being limited to very few headlight beam illumination patterns and/or including numerous mechanical elements to steer or otherwise modify the headlight beam illumination pattern. Thus, there remains a need for a vehicle headlight system that provides a robust, automatically adaptable headlight beam illumination pattern.

SUMMARY OF INVENTION

The present invention provides a vehicle headlight system complemented by a modulated beam in each of the two headlights using an adaptive illumination pattern control to improve roadway illumination and driver visibility and thereby enhance vehicle safety. The present invention is robust in that it utilizes bitmap images to digitally control headlight beam patterns in response to vehicle and roadway conditions. A vehicle headlight system in accordance with one embodiment of the present invention includes a light source, digital beam forming optics optically coupled to the light source, and a memory storing a plurality of light illumination patterns. The memory is electrically coupled to the digital beam forming optics. The digital beam forming optics are adapted to output light from the light source in the form of at least one of the light illumination patterns in response to at least one vehicle operating condition. In one embodiment, the light illumination patterns are bitmap light patterns and the digital beam forming optics is a digital light processor.

In another aspect of the invention, an illumination system for a vehicle includes a light source, a digital light processor optically coupled to the light source, and a memory storing a plurality of light illumination patterns, the memory being electrically coupled to the digital light processor. The digital light processor outputs light from the light source in the form of at least one of the light illumination patterns in response to at least one vehicle operating condition. The system also includes at least one headlight emitter optically coupled to the digital light processor and positioned to emit the light received from the digital light processor in a region forward of the vehicle. In one embodiment of the system, the digital light processor outputs light from the light source in the form of at least one of the light illumination patterns in response to at least one vehicle operating condition or at least one roadway condition. The vehicle operating condition can be vehicle speed wherein the illumination pattern adapts as a function of vehicle speed, or the sensing of an oncoming vehicle wherein the illumination pattern adapts to reduce the amount of headlight glare presented to the sensed oncoming vehicle. The vehicle operating condition can also be the vehicle turn signal status and/or steering wheel angle wherein the illumination pattern adapts to illuminate a region of intended travel for the vehicle. The vehicle roadway condition can be a curve in the road or intersection wherein the illumination pattern adapts to optimize the vehicle lighting to enhance the operator's visibility of curving roadway or intersection area.

In a further aspect of the invention, a method of operating an illumination system for a vehicle having a light source and a digital light processor optically coupled to the light source is provided. The method includes providing a plurality of light illumination patterns each corresponding to a desired vehicle headlight illumination pattern for a sensed vehicle operating condition, and controlling the digital light processor to process light from the light source to form of at least one of the desired vehicle headlight illumination patterns in response to at least one sensed vehicle operating condition. In one example, the method includes sensing the presence of oncoming vehicle headlights and, when no oncoming vehicle headlights are sensed, controlling the digital light processor to output a light illumination pattern having substantially symmetrical illumination about the vehicle central axis. In another example, the method includes controlling the digital light processor to adaptively process light according to different light illumination patterns indexed by vehicle speed. In a further example, the method includes controlling the digital light processor to adaptively process light according to different light illumination patterns in response to a sensed roadway condition.

The present invention is advantageous in that it provides for digital control of each of the two headlight beam patterns in response to vehicle and roadway conditions thereby providing nearly infinite variability of the headlight beam illumination patterns without the need for mechanical manipulation of the headlights.

Other advantages and features of the invention will become apparent to one of skill in the art upon reading the following detailed description with reference to the drawings illustrating features of the invention by way of example.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

While the present invention is described with respect to a method and apparatus for an adaptive vehicle headlight system, the present invention may be adapted and utilized for vehicle collision avoidance systems. Thus, just as the adaptive vehicle headlight system of the present invention operates to improve the vehicle headway visibility to the vehicle driver, the present invention may also be used to improve the visibility of objects or other vehicles to a vehicle night vision system or vehicle collision avoidance system.

In the following description, various operating parameters and components are described for one constructed embodiment. These specific components and parameters are included as examples and are not meant to be limiting.

Figure 1:
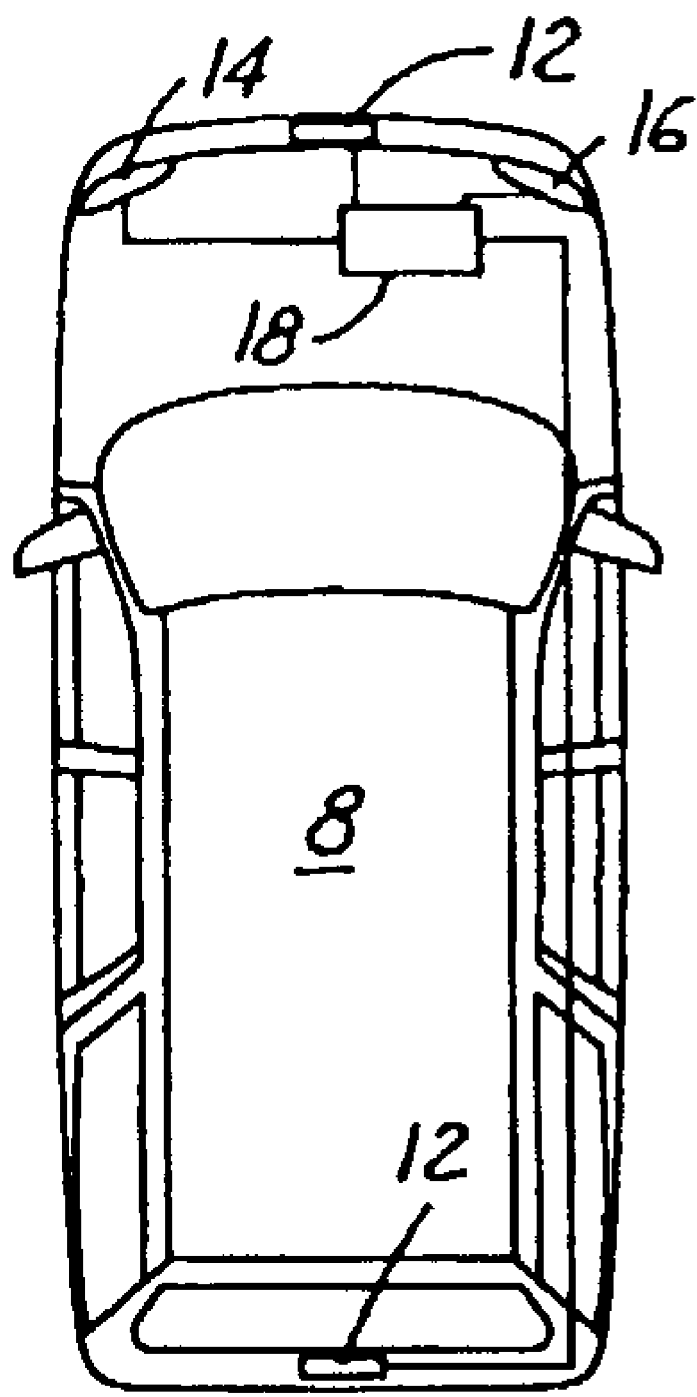
FIG. 1 is a schematic diagram of a vehicle headlight system in accordance with one embodiment of the present invention.

Referring now to the drawings wherein like reference numerals are used to identify identical components in the various views, FIG. 1 illustrates a schematic diagram of an adaptive vehicle headlight system 10 in accordance with one embodiment of the present invention. The adaptive vehicle headlight system 10 is shown in relation to an exemplary vehicle 8. The system 10 includes a sensor 12 for detecting oncoming vehicle headlights and leading vehicle tail lamps. The sensor 12 is shown as being positioned centrally in the front of the vehicle 8 but could also be positioned anywhere on the vehicle in the forward-facing direction. In cases where it may also be desirable to adaptively modify the headlight beam pattern upon detection of a trailing vehicle's headlights, a sensor 12 may also be located in the rear of the vehicle as shown or any other location on the vehicle facing the rearward direction.

The system 10 also includes first and second headlights 14, 16 that are conventionally located at the front of the vehicle 8 on the driver's side and passenger's side, respectively. Of course, the location, size, look, and number of headlights can vary depending upon the type of vehicle and vehicle aesthetics. In response to data from sensor 12 as well as other vehicle and roadway data, the beam patterns formed by headlights 14, 16 are adaptively modified by the system architecture 18. Headlights 14, 16 may be merely lenses for emitting light received from the light source as conditioned by the digital light processor as described below.

Figure 2:
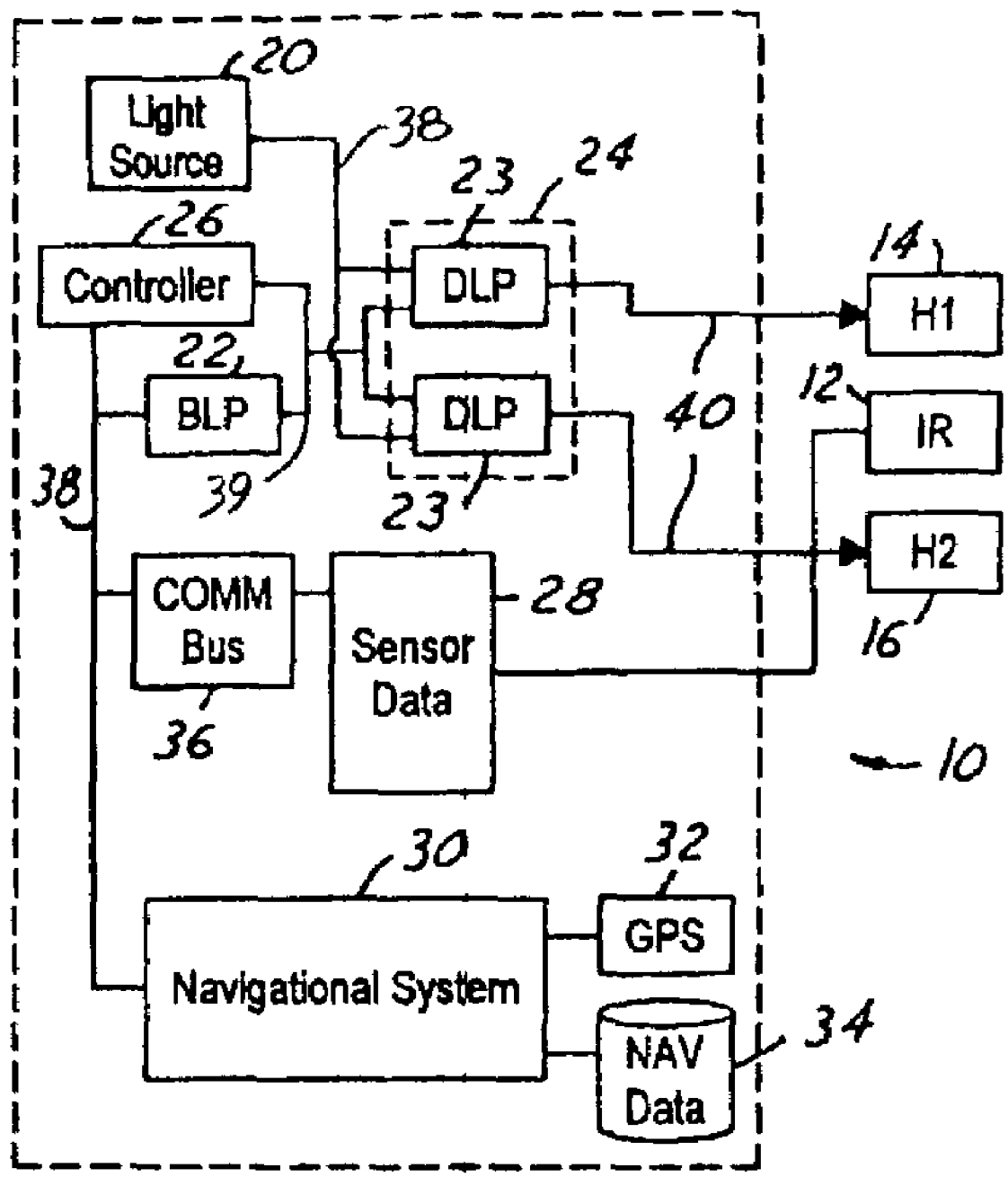
FIG. 2 is a schematic block diagram detailing portions of the vehicle headlight system of FIG. 1.

Referring now to FIG. 2, there is shown a schematic block diagram detailing portions of the adaptive vehicle headlight system of FIG. 1. As can be seen in FIG. 2, the vehicle headlight system architecture 18 includes a light source 20, a memory 22 storing a plurality of bitmap light patterns (BLP) and digital beam forming optics 24. The digital beam forming optics 24 are under the control of a controller 26 which receives vehicle and roadway data from sensor data 28 as well as navigational system 30, if the vehicle is so equipped. The controller 26 can receive various vehicle sensory data by way of the vehicle communication bus 36. The navigational system 30 may include global positioning (GPS) data 32 as well as navigational roadway data 34. The light source 20 is optically coupled to the digital beam-forming optics 24 by way optical coupling 38 and, in turn, the digital beam-forming optics 24 is coupled to the first and second headlights 14, 16 by way of optical coupling 40. Optical couplings 38, 40 may comprise, for example, fiber optic cable, and optical coupling 40 would be the illumination optics (lens assembly). The electrical signals 39 are used to control the digital beam forming optics 24. Each of these components will now be described in more detail.

The light source 20 can include any high intensity discharge light source or LED cluster which acts as a light engine for providing light in the desired spectral range to the digital beam-forming optics 24 to ultimately be output by headlight assemblies 14, 16 to illuminate the roadway. Optionally or in addition, the light source 20 may include an infrared light source or near infrared light source or a laser light source if the adaptive headlight system of the present invention is to be used as part of a vehicle collision avoidance system or vehicle night vision system. In the embodiment shown, the light source 20 is not a headlamp and thus is a non-headlamp light source.

The bitmap light patterns are used to define the desired emitted light patterns on the roadway. The bitmap light patterns are stored in memory 22 which may comprise, for example, a look-up table which includes a plurality of bitmap light patterns to be used by the digital beam-forming optics to create the desired headlight beam illumination pattern. In one example, the bitmap light patterns are stored as 1024 ×768 pixel resolutions bitmaps. The bitmap light patterns can define, for example, high-beam and low-beam patterns for each headlight assembly 14, 16 as well as left turn and right turn light patterns. Vehicle speed indexed light patterns are also contemplated wherein the illumination would be increased in distance as the vehicle speed increases. The output of the headlight assemblies 14, 16 corresponding to these bitmap light patterns will be described below in more detail with reference to FIGS. 4 through 7.

The digital beam-forming optics 24 under control of the controller 26 uses a bitmap light pattern from the stored bitmap light patterns 22 to configure light received from a light source 20 for output to the headlight assemblies 14, 16. In one example, the digital beam forming optics 24 comprise two digital light processors (DLPs) 23 such as is available from Texas Instruments Corporation. Each DLP 23 is a light processor capable of configuring light received from the light source 20 into any desired pattern as defined by the bitmap light patterns 22. Once the digital light processor 23 has conditioned the light to be configured according to the selected bitmap light pattern, it is optically transported by way of optical coupling 40 to the headlights 14, 16. The headlights 14, 16 may comprise, for example, merely a lens element for conveying the preconditioned light into the region forward of the vehicle. In this way, the headlights 14, 16 are stationary with respect to the vehicle body and need not include a light source or any moveable parts for modifying the illumination beam pattern. The headlights 14, 16 merely act as emitters of the preconditioned light received from the DLP 23 and, in that sense, may also be referred to as headlight emitters 14,16.

The sensor 12 for detecting oncoming vehicle headlights may comprise an infrared sensor as headlights and taillights are infrared sources which include output in the range of 700 to 1100 angstroms. An IR emitter may also be included within sensor 12 so that vehicle information including the BLP being used by the vehicle can be encoded and transmitted in the IR part of the electromatic spectrum to similarly equipped vehicles having an adaptive vehicle headlight system according to the present invention. Oncoming vehicle headlight detection may also be aided by the use of a forward looking radar sensor that is capable of detecting vehicles in motion toward or in the same direction.

The controller 26 may be a microprocessor-based controller for providing control of each DLP 23. The controller 26 may be implemented as a separate controller for the adaptive vehicle headlight system or may be implemented as part of the engine control unit or other vehicle controller. The control 26 is in communication with both DLPs 23, BLP 22, sensor data 28 and navigational system 30. The controller 26 may be in direct communication with these components, or may communicate with each by way of the vehicle communications bus 36 as shown with respect to the sensor data 28.

The sensor data 28 provides vehicle data for bitmap light pattern selection. Vehicle data may include such things as the vehicle type, speed, vehicle heading, location, vehicle directional information, steering wheel angle, brake status, brake pressure, throttle angle, road temperature, traction control status, differential wheel speed, light status (on/off), turn signal status (right, neutral, left), windshield wiper status and windshield wiper rate. The heading information may be obtained, for example, by an inertial navigational system providing compass information, heading, yaw, pitch, and roll information to the vehicle communication bus.

If the vehicle is so equipped, navigational system 30 can also provide relevant data to the processor 26 for selecting the appropriate bitmap light pattern to be output to the headlights 14, 16. The vehicle navigational system 30 may include global positioning satellite (GPS) data 32 which may be embodied as conventional GPS, differential GPS, or carrier differential GPS. Navigational data 34 may also be included in the form of digital navigational map data. The navigational system 30 can be used to provide road segment classification and intersection determination data including elevation changes in the road surface, which would require change in the light patterns to the processor 26. In addition, when GPS information is not available or is sporadic due to buildings or atmospheric affects, the inertial guidance system can be used to provide sub-second geospacial reckoning to provide the controller with knowledge of the vehicle location and heading information.

In operation, bitmap light patterns 22 are selected by the controller 26 and formed by the digital light processors 23 in combination with the light source to improve roadway illumination and enhance vehicle safety. The controller 26 selects the bitmap light patterns 22 in response to input from the sensor 12 (IR sensor), sensor data 28, and if available, navigational system data 30. Numerous headlight beam illumination patterns can thus be digitally formed by each independent DLP 23 depending upon the vehicle and roadway conditions without the need for multiple lenses, bulbs or other mechanical devices for modifying the headlight beam illumination pattern of the vehicle.

Figure 3:
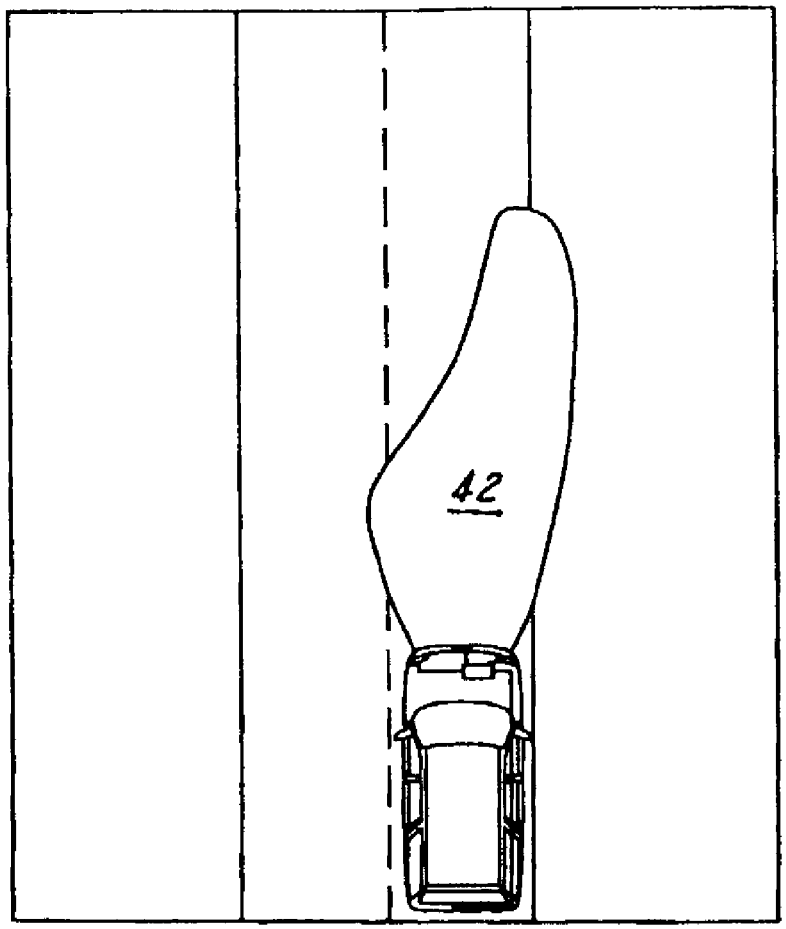
FIG. 3 shows a typical headlight beam illumination pattern for a vehicle according to the prior art.

Referring now to FIG. 3, there is shown a typical headlight beam illumination pattern for a vehicle according to the prior art. FIG. 3 shows a typical lighting footprint in the form of a traditional headlight illumination pattern 42 of a traditional headlight assembly wherein the light pattern is regulated to be asymmetric about the central vehicle axis to reduce glare experienced by oncoming vehicle traffic. Of course, this traditional headlight illumination pattern 42 could be included as one of the desired bitmap light patterns in the adaptive vehicle headlight system of the present invention.

Figure 4:
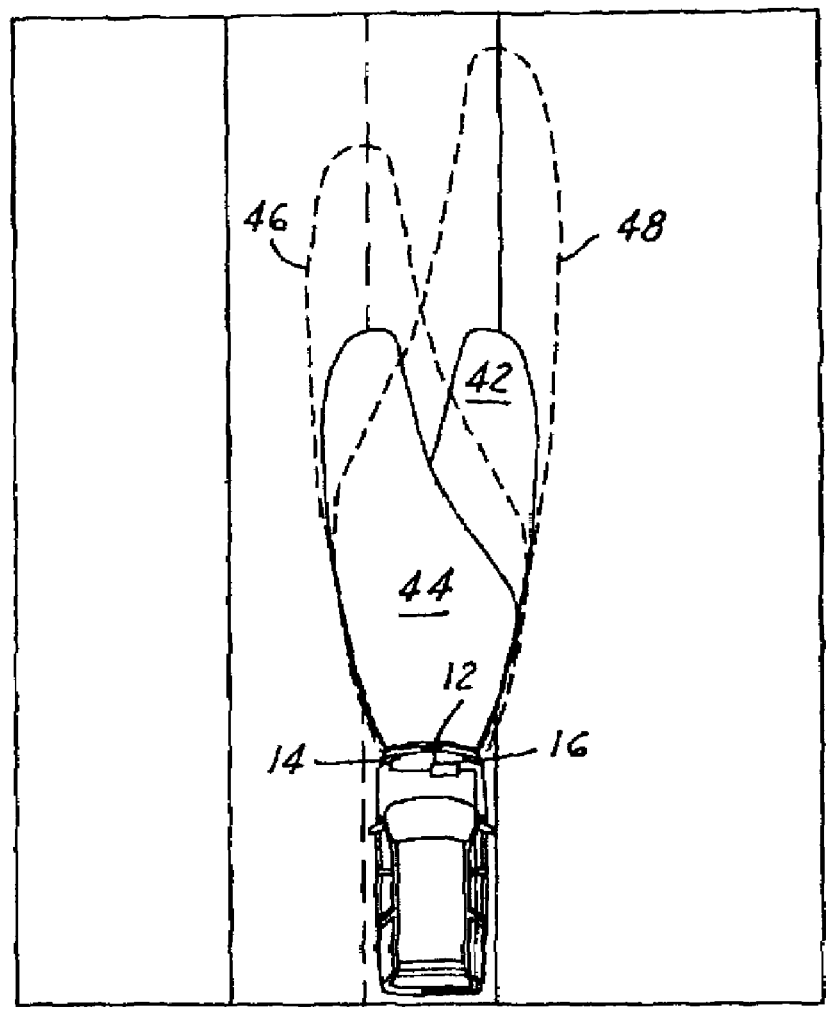
FIG. 4 shows headlight beam illumination patterns for a vehicle having an adaptive vehicle headlight system according to the present invention.

Referring now to FIG. 4, there are shown several exemplary headlight beam illumination patterns for a vehicle having an adaptive vehicle headlight system according to the present invention. In this example, in the presence of oncoming vehicle traffic, a traditional beam pattern 42 may be output by the adaptive vehicle headlight system. An advantage of the adaptive vehicle headlight system according to the present invention is that it not only provides traditional lighting patterns such as beam illumination pattern 42 but can also provide enhanced lighting which changes dynamically under varying operating conditions. Thus, in the example of FIG. 4, based on the input from sensor 12 such as the IR signal strength of any detected oncoming traffic, the controller 26 can estimate if a symmetrical illumination pattern would provide an acceptable level of glare for oncoming traffic. If the conditions are determined to be appropriate, the adaptive headlight system of the present invention can provide a symmetric pattern 44 which includes the light illumination pattern 42 to enhance driver visibility and improve vehicle safety through advanced driving warning.

The extent to which the left headlight 14 is driven within its potential illumination range 46 or the right headlight 16 is driven within its potential illumination range 48 is a function of the sensor data 28, the presence of oncoming vehicle headlights or leading vehicle taillights and, optionally, navigational system data 30. Based upon these inputs, the system can dynamically increase the apparent range of the headlights 14, 16 either individually or collectively. In one example, the illumination range of the headlights 14, 16 is increased as the vehicle speed increases to reduce the likelihood of "overdriving" the illuminated region forward of the vehicle. In the presence of oncoming vehicle traffic, the illumination range of the driver's side vehicle headlight 14 can be dynamically reduced to prevent an undesirable amount of glare to the oncoming vehicle driver. Depending upon the vehicle heading and roadway conditions, i.e., a straightway or a curve, the illumination range of the passenger side vehicle headlight 16 may continue to be adaptively modified as a function of the vehicle speed. In this way, the present invention permits the region forward of the vehicle to be dynamically illuminated to the greatest extent possible without inducing unacceptable glare or interference to oncoming or leading vehicle traffic. In the example of FIG. 4, several bitmap light patterns can be created for each of headlights 14, 16 each of which represents a different illumination range. If no oncoming vehicle traffic is detected, the bitmap light patterns can be implemented by the DLP under the control of the processor to provide successively further symmetrical illumination in the region forward of the vehicle as the vehicle's speed increases.

Figure 5:
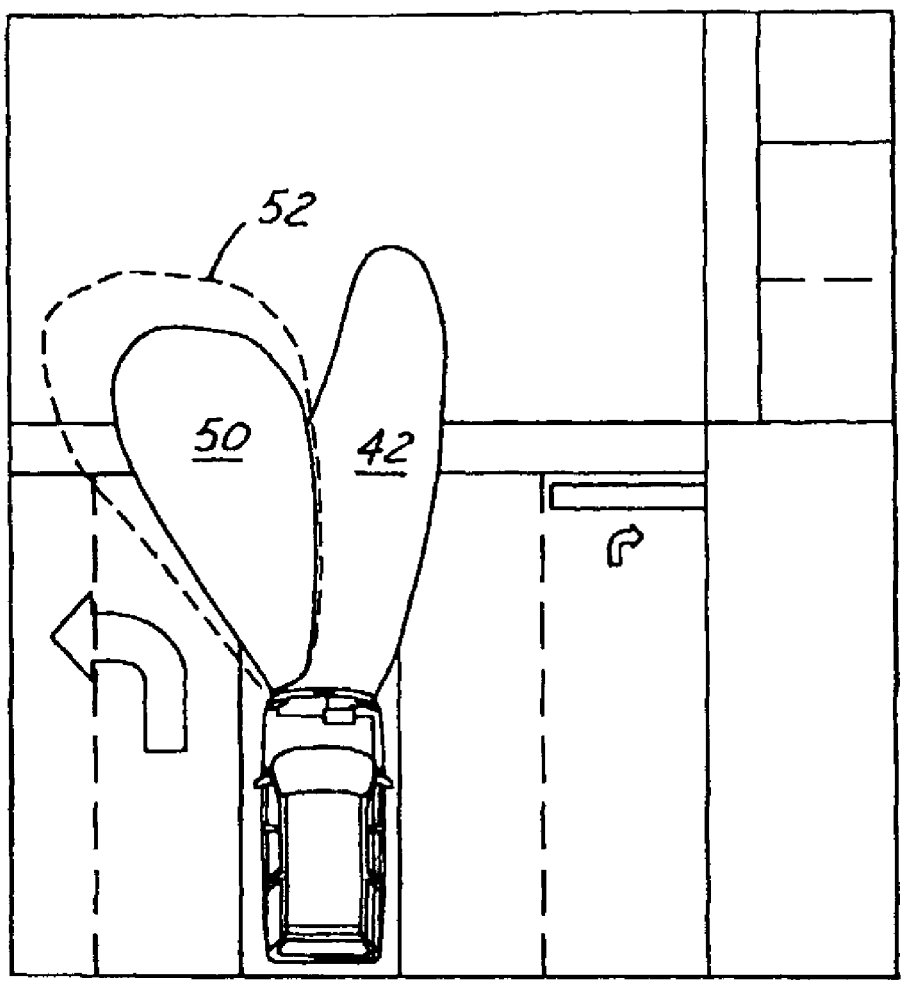
FIG. 5 shows one example of a headlight beam illumination pattern during turn signal activation for a vehicle having an adaptive vehicle headlight system according to the present invention.

In FIG. 5 there is shown another example of the headlight beam illumination pattern during turn signal control for a vehicle having an adaptive vehicle headlight system according to the present invention. In this example, the conventional beam illumination pattern 42 is again shown for reference purposes. If the sensor data 28 includes turn signal status, the turn signal status can be used to call up a bitmap light pattern for enhanced illumination in the direction of the anticipated turn. Thus, for example, if the turn signal is activated to indicate an impending left turn, a headlight beam illumination pattern 50 can be created to overlay the traditional footprint 42 to enhance the visibility in the direction of the anticipated turn. The range of illumination within the potential range 52 for the anticipated left turn can be dynamically modified as a function of, for example, the steering wheel angle and the vehicle speed. Based upon the steering wheel angle and/or the vehicle approach speed, the lighting can be focused not only in the direction of the turn, but the steering wheel angle can be used to align the beam for optimum illumination. Again, this can be implemented as a series of bitmap light patterns stored in the BLP memory 22. Thus, for example, upon activation of the left-hand turn signal of the vehicle, an initial left turn bitmap light pattern can be implemented by each DLP which can be modified by subsequent left hand turn bitmap light patterns optimized for vehicle speed and/or steering wheel angle. It is also possible to adapt the turn pattern to the upcoming intersection geometry based on GPS and navigation information. Exit ramp and intersection angles can be retrieved from the navigation system map database allowing the beam pattern to be further customized. A corresponding group of right hand turn signal bitmap light patterns would also be stored in the BLP memory 22.

Figure 6:
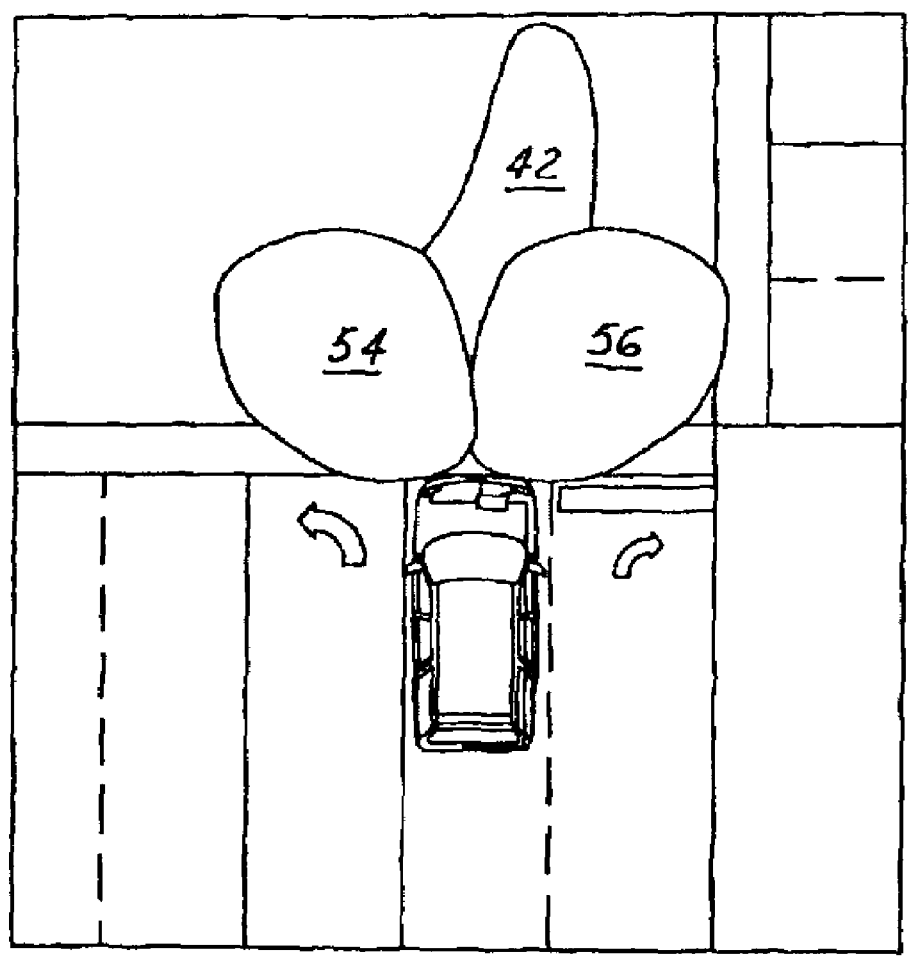
FIG. 6 shows another example of a headlight beam illumination pattern for a vehicle approaching an intersection and equipped with an adaptive headlight system according to the present invention.

Referring now to FIG. 6, there is shown one example of a headlight beam illumination pattern for a vehicle approaching an intersection and equipped with an adaptive vehicle headlight system according to the present invention. Again, the reference headlight beam illumination beam pattern 42 is also shown. In FIG. 6, an example of speed sensitive lighting adaptation at an intersection Is shown for enhanced illumination and object detection for the vehicle driver. Driver's side and passenger's side fanned illumination patterns 54, 56 are activated to augment the illumination provided by the reference illumination pattern 42 when the vehicle is approaching an intersection at a reduced speed, or is stopped at an intersection. Thus, for example, when data from the navigational system data 30 indicates that the vehicle is at or near an intersection, and the vehicle speed data indicates that the vehicle is traveling below a threshold speed or stopped at the Intersection, bitmap light patterns in the form of driver's side and passenger side fanned illumination patterns 54, 56 can be called up by the processor 26 to be activated by the DLP 23 to enhance the vehicle operator's visibility of the roadway curves, pedestrians, or other objects which may be present at the intersection as well as to better illuminate the intersection itself for pedestrians, bicyclists or other vehicles within the vicinity of the intersection. Again, as in the previous examples, depending upon the type of intersection encountered, i.e. a major multi-lane intersection, or a minor intersection, different bitmap light patterns may be activated accordingly.

Figure 7:
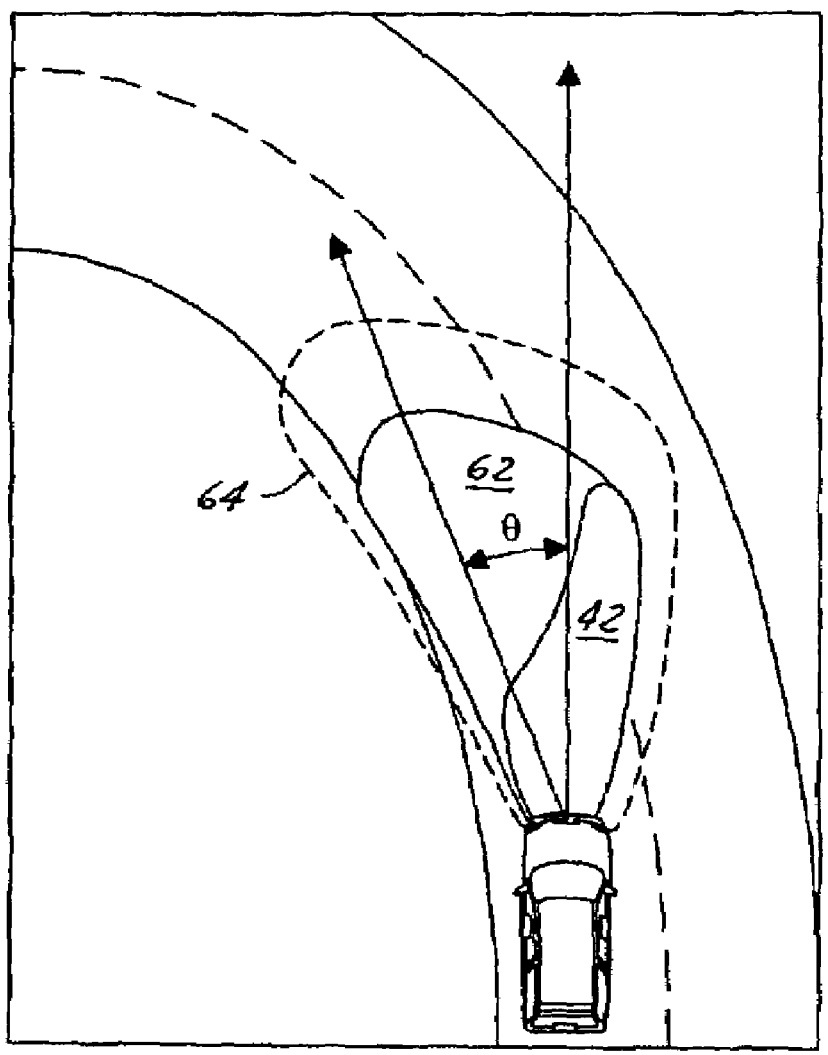
FIG. 7 shows another example of a headlight beam illumination pattern for a vehicle on a curve and equipped with a vehicle headlight system according to the present invention.

Referring now to FIG. 7, there is shown another example of a headlight beam illumination pattern for a vehicle equipped with an adaptive vehicle headlight system according to the present invention. In the example of FIG. 7, the vehicle is traveling on a curved road 60, and the reference lighting pattern 42 is again illustrated. FIG. 7 shows one enhanced illumination pattern 62 within the potential range of illumination patterns 64 provided by the adaptive vehicle headlight system according to the present invention for the determined roadway curvature. The potential illumination pattern 64 shown is for a road curvature to the left. Of course, a complimentary potential illumination pattern would also be stored in the bitmap light pattern memory 22 corresponding to a right hand roadway curvature. In this example, the vehicle speed, steering wheel angle, and navigational system data 30 are used to determine the appropriate bitmap light pattern to be used by the DLPs 23 for roadway illumination. To determine whether the vehicle is traveling on a curve, the GPS 32 can be used in combination with the navigational roadway data in a manner which is know in the art. For example, based upon digitally stored mapping data, the angle θ corresponding to the roadway curvature can be determined between successive vehicle position data points.

From the foregoing, it can be seen that there has been brought to the art a new and improved adaptive vehicle headlight system which advantages over prior vehicle headlight systems. While the invention has been described in connection with one or more embodiments, it should be understood that the invention is not limited to those embodiments. For example, while the examples contained herein described roadway illumination with visible light for improved driver roadway visibility, the present invention is also contemplated for use with infrared or otherwise non-visible light sources for night vision systems or vehicle collision avoidance system implementations. Thus, the invention is intended to cover all alternatives, modifications, and equivalents as may be included within the spirit and scope of the appended claims.

The invention claimed is:

1. A vehicle headlight system comprising:
   a centralized light source;
   digital beam forming optics optically coupled to and receiving transmitted light from the centralized light source;
   first and second headlight emitters, one positioned at a front driver's side of the vehicle and one positioned at a front passenger's side of the vehicle, and wherein at least one of said centralized light source or said digital beam forming optics is remotely located from said first and second headlight emitters;
   a memory storing a plurality of light illumination patterns, said memory electrically coupled to said digital beam forming optics, said digital beam forming optics outputting light from said centralized light source in the form of at least one of said light illumination patterns for each of said first and second headlight emitters independent of each other, and in response to at least one vehicle operating condition.

2. A vehicle headlight system according to claim 1 wherein said light illumination patterns are bitmap light patterns and said digital beam forming optics is at least one digital light processor.

3. A vehicle headlight system according to claim 1 wherein said first and second headlight emitters are positioned to emit said light received from said digital beam forming optics in a region forward of said vehicle.

4. A vehicle headlight system according to claim 1 wherein said plurality of light illumination patterns includes at least two different light illumination patterns each corresponding to different sensed vehicle speeds.

5. A vehicle headlight system according to claim 1 wherein said plurality of light illumination patterns includes at least two different light illumination patterns for said first and second headlight emitters that correspond to a left vehicle turn signal activation and a right vehicle turn signal activation, respectively.

6. A vehicle headlight system according to claim 1 wherein said centralized light source is a near infrared light source.

7. A vehicle headlight system according to claim 1 wherein said vehicle operating condition comprises at least one of: vehicle speed, directional heading, location, steering wheel angle, brake status, throttle angle, turn signal status, traction control status, differential wheel speed, light status, turn indicator status, windshield wiper status, windshield wiper speed, and engine speed.

8. A vehicle headlight system according to claim 1 further comprising at least one IR sensor for detecting oncoming vehicle headlights, and wherein said plurality of light illumination patterns includes at least one light pattern for output by said digital beam forming optics in response to sensed oncoming vehicle headlights.

9. A system as in claim 1 wherein said digital beam forming optics are optically coupled to the centralized light source via a first optical coupling and said first and second headlight emitters are coupled to said digital beam forming optics via a second optical coupling.

10. An illumination system for a vehicle comprising:
a centralized light source;
a digital light processor optically coupled to and receiving transmitted light from the centralized light source;
a memory storing a plurality of light illumination patterns, said memory electrically coupled to said digital light processor, said digital light processor outputting light from said centralized light source in the form of at least one of said light illumination patterns in response to at least one vehicle operating condition; and
at least one headlight emitter optically coupled to said digital light processor and positioned to emit said light received from said digital light processor in a region forward of said vehicle, said headlight emitter being located remotely from at least one of said centralized light source or said digital light processor;
wherein said digital light processor outputs light from said centralized light source in the form of at least one of said light illumination patterns in response to at least one roadway condition; and
wherein said at least one roadway condition comprises vehicle absolute positioning data or navigational roadway data including intersections, ramps and roadway surface elevations/depressions.

11. An illumination system for a vehicle comprising:
a centralized light source;
a digital light processor optically coupled to and receiving transmitted light from the centralized light source;
a memory storing a plurality of light illumination patterns, said memory electrically coupled to said digital light processor, said digital light processor outputting light from said centralized light source in the form of at least one of said light illumination patterns in response to at least one vehicle operating condition;
at least one headlight emitter optically coupled to said digital light processor and positioned to emit said light received from said digital light processor in a region forward of said vehicle, said headlight emitter being located remotely from at least one of said centralized light source or said digital light processor; and
at least one IR sensor for detecting oncoming vehicle headlights, and wherein said plurality of light illumination patterns includes at least one light pattern for output by said digital light processor in response to sensed oncoming vehicle headlights.

12. An illumination system for a vehicle according to claim 10 or 11 or wherein said plurality of light illumination patterns are bitmap light patterns.

13. An illumination system for a vehicle according to claim 10 or 11 wherein said vehicle operating condition steering wheel angle, brake status, throttle angle, turn signal status, traction control status, differential wheel speed, light status, windshield wiper status, and windshield wiper speed.

14. An illumination system for a vehicle according to claim 1O or 11 wherein said plurality of light illumination patterns includes at least two different light illumination patterns each corresponding to different sensed vehicle speeds.

15. A method of operating an illumination system for a vehicle comprising a light source and a digital light processor remotely optically coupled to the light source, the method comprising:
providing a plurality of light illumination patterns each corresponding to a desired vehicle headlight illumination pattern for a sensed vehicle operating condition;
controlling said digital light processor to process transmitted light from said light source to form at least one of said desired vehicle headlight illumination patterns for illumination transmittance from headlights of the vehicle in response to at least one sensed vehicle operating condition; and
sensing the presence of oncoming vehicle headlights and, when no oncoming vehicle headlights are sensed, controlling said digital light processor to output a light illumination pattern having substantially symmetrical illumination about a vehicle central axis.

16. A method according to claim 15 comprising controlling said digital light processor to adaptively process light according to different light illumination patterns indexed by vehicle speed.

17. A method according to claim 15 comprising controlling said digital light processor to adaptively process light according to different light illumination patterns in response to a sensed roadway condition.

* * * * *